US007853685B1

(12) United States Patent
Maturi

(10) Patent No.: US 7,853,685 B1
(45) Date of Patent: Dec. 14, 2010

(54) IDENTIFYING CRITICAL NETWORK AND APPLICATION ENTITIES

(75) Inventor: Mohan Kumar Maturi, San Jose, CA (US)

(73) Assignee: Network General Technology, George Town, Grand Cayman (KY)

( * ) Notice: Subject to any disclaimer, the term of this patent is extended or adjusted under 35 U.S.C. 154(b) by 1190 days.

(21) Appl. No.: 11/484,482

(22) Filed: Jul. 10, 2006

(51) Int. Cl.
*G06F 15/173* (2006.01)
(52) U.S. Cl. ...................................................... 709/224
(58) Field of Classification Search .................. 709/224
See application file for complete search history.

(56) References Cited

U.S. PATENT DOCUMENTS

| 6,502,131 | B1 * | 12/2002 | Vaid et al. | 709/224 |
| 6,601,084 | B1 * | 7/2003 | Bhaskaran et al. | 718/105 |
| 6,606,643 | B1 * | 8/2003 | Emens et al. | 709/203 |
| 6,996,502 | B2 * | 2/2006 | De La Cruz et al. | 702/188 |
| 7,093,013 | B1 * | 8/2006 | Hornok et al. | 709/224 |
| 7,260,627 | B2 * | 8/2007 | Kryskow et al. | 709/224 |
| 7,464,302 | B2 * | 12/2008 | Chen et al. | 714/47 |
| 7,644,087 | B2 * | 1/2010 | Barkai et al. | 709/224 |
| 2003/0065769 | A1 * | 4/2003 | Kryskow et al. | 709/224 |

\* cited by examiner

*Primary Examiner*—Saleh Najjar
*Assistant Examiner*—Edward J Kim
(74) *Attorney, Agent, or Firm*—Fenwick & West LLP

(57) ABSTRACT

Critical servers are identified in a network, based upon network flow records collected from the network for a predetermined period. A plurality of rules are applied to application-server pairs based upon the collected network flow records to identify, among the application-server pairs, candidate application-server pairs that satisfy at least one of the plurality of rules during the predetermined period in excess of a predetermined number of times, in which case the application-server pair is identified as a candidate application-server pair. A global application-server list including application-server pairs identified across all of the sources is determined. A critical server list including servers corresponding to the global application-server list is generated. Various network mappings comprised of the servers in the critical server list are created, and network measures corresponding to the mappings are displayed.

21 Claims, 4 Drawing Sheets

IDENTIFYING CRITICAL NETWORK AND APPLICATION ENTITIES

BACKGROUND OF THE INVENTION

1. Field of the Invention

The present invention relates to network data management and, more specifically, to a system and method for identifying business critical network and application entities from the collected network data and displaying network data filtered for such identified business critical network and application entities.

2. Description of the Related Art

Today's computer networks are extremely complex, with hundreds or more of applications, thousands or more of servers, hundreds or more of locations, hundreds of thousands of clients, and network traffic routed by numerous switches and routers on the computer networks. Different parts of the networks are operated and managed by various individuals and groups within an organization. Thus, it is extremely difficult to understand interdependencies between network elements, applications, and servers and to obtain a complete overview of the network. It is also difficult to understand application traffic flows and access patterns and to identify key servers that keep the business running.

Conventional solutions to managing such complex networks are to have devices that actively probe routers, switches, and nodes on the network for applications to create a network map. However, the network maps created by such conventional solutions are very large, complex, and difficult to understand for large networks. The conventional network maps may provide details about node locations, but fail to identify the business critical network nodes that have a significant impact on the network. In addition, such conventional network maps also fail to detect behavioral trends of the network over a period of time with respect to specific measures such as throughput, access pattern, and response times. Such drawbacks of the conventional solutions present a significant challenge to a network manager who needs to understand the structure of the network and solve various problems that may occur in the network.

Therefore, there is a need for a technique for identifying business critical network and application entities based on network data collected from the network. There is also a need for a technique for effectively displaying network data based upon the identified critical network and application entities, so that a network manager may effectively manage the network.

SUMMARY OF THE INVENTION

Embodiments of the present invention include a method, a computer program product, and a system for identifying a critical server in a computer network based upon network flow records collected from the network. The network flow records are collected for a predetermined period from a plurality of sources. A plurality of rules are applied to a plurality of application-server pairs based upon the collected network flow records to identify, among the application-server pairs, one or more candidate application-server pairs that satisfy at least one of the rules during the predetermined period for each of the sources. In one embodiment, it is determined whether each of the application-server pairs satisfies at least one of the rules in excess of a predetermined number of times during the predetermined period, in which case the application-server pair is identified as a candidate application-server pair.

One of the rules is to determine whether a total number of bytes of traffic coming into and going out of a server for an application, both of which corresponding to the application-server pair, exceeds a predetermined number of bytes. Another one of the rules is to determine whether a total number of clients accessing a server for an application, both of which corresponding to the application-server pair, exceeds a predetermined number of clients. Still another one of the rules is to determine whether a percentage of application traffic for an application into a server, both of which corresponding to the application-server pair, out of a total application traffic for the application corresponding to the application-server pair, exceeds a predetermined percentage.

Furthermore, a global application-server list is determined where the global application-server list includes the candidate application-server pairs identified across all of the sources. If the application-server pairs are included in the global application-server list, the importance levels assigned to the application-server pairs are adjusted to indicate that they are critical entities. Then, a critical server list is created where the critical server list includes the servers corresponding to at least some of the application-server pairs in the global application-server list. Network mappings comprised of all applications, only the servers in said critical server list, subnets, and location are created, and a plurality of network measures corresponding to the mappings are computed and displayed.

In addition, the processes of collecting the network flow records, applying the rules, and identifying the candidate application-servers are repeated during a subsequent predetermined period to determine another global application-server list that correspond to the candidate application-server pairs identified across all of the sources during the subsequent predetermined period. If the application-server pairs are not included in said another global application-server list but are included in said global application-server list, then the importance levels assigned to the application-server pairs are adjusted to a lower level.

The present invention has the advantage that critical network servers can be identified among a number of entities in the network. Since the network mappings are created based upon the identified critical network servers, the network measures can be filtered to only show data relevant to the mappings corresponding to the critical network servers. Therefore, a network manager can conveniently determine the critical network entities and their various network measures, and thereby effectively manage the network.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

The teachings of the embodiments of the present invention can be readily understood by considering the following detailed description in conjunction with the accompanying drawings.

DETAILED DESCRIPTION OF EMBODIMENTS

The Figures (FIG.) and the following description relate to preferred embodiments of the present invention by way of illustration only. It should be noted that from the following discussion, alternative embodiments of the structures and methods disclosed herein will be readily recognized as viable alternatives that may be employed without departing from the principles of the claimed invention.

Reference will now be made in detail to several embodiments of the present invention(s), examples of which are illustrated in the accompanying figures. It is noted that wherever practicable similar or like reference numbers may be used in the figures and may indicate similar or like functionality. The figures depict embodiments of the present invention for purposes of illustration only. One skilled in the art will readily recognize from the following description that alternative embodiments of the structures and methods illustrated herein may be employed without departing from the principles of the invention described herein.

Figure 1:
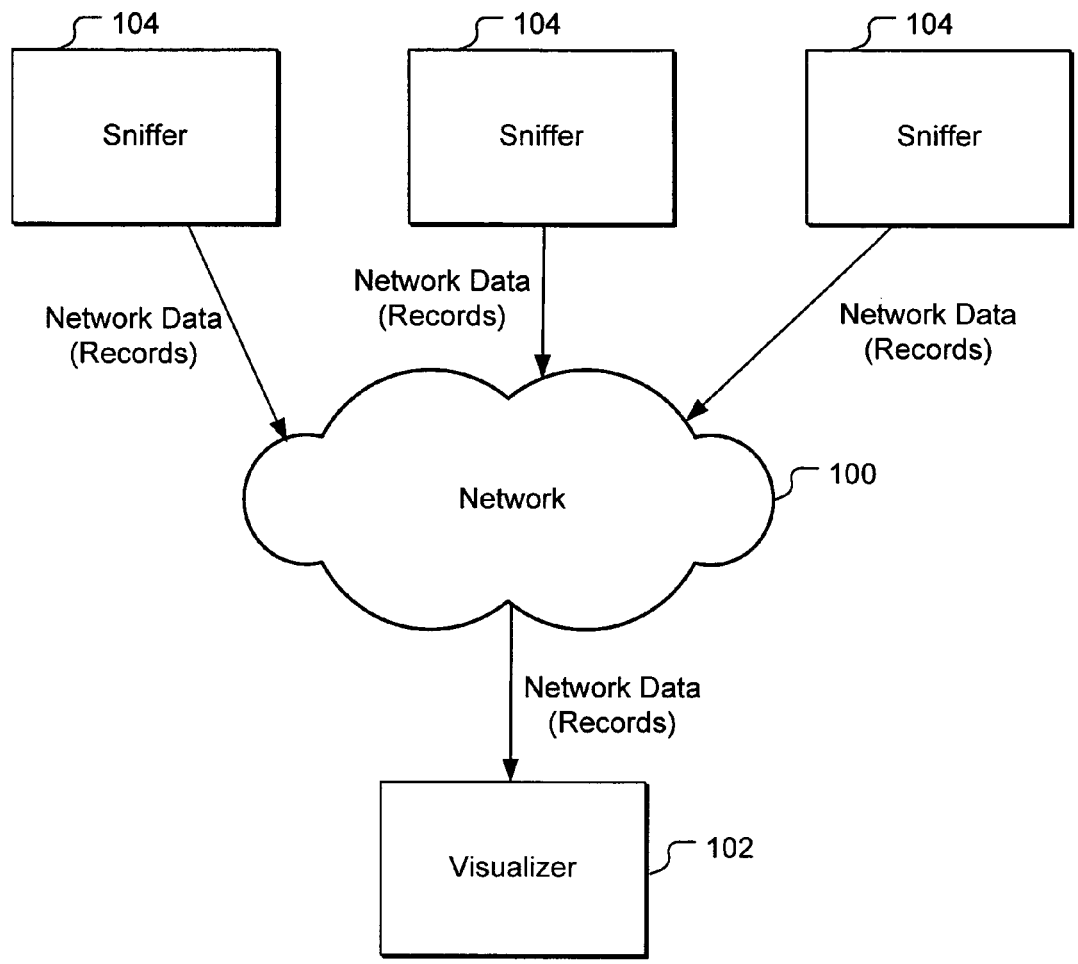
FIG. 1 illustrates the system architecture for a visualizer displaying network data collected from a network, according to one embodiment of the present invention.

FIG. 1 illustrates the system architecture for a visualizer displaying network data collected from a network, according to one embodiment of the present invention. As shown in FIG. 1, a number of network sniffer devices 104 are deployed in various nodes of the network 100 collecting network data. The network data typically include application intelligence data and RMON (Remote Monitoring of Networks) data. Network data is typically comprised of a series of records (network activity from a source) including a variety of keys (location, application, client, server, virtual circuit, etc.) and a variety of measures (number of bytes, number of packets, response times, etc.).

The network data (records) collected by the sniffer devices 104 are provided to the visualizer 102. The sniffer devices 104 may provide raw network data to the visualizer 102, or may pre-process the network data in a form more convenient for processing by the visualizer 102. As will be explained in more detail with reference to FIGS. 3 and 4, the visualizer 102 includes intelligence and functionalities for identifying business critical network entities and applications that have a significant impact on the network 100 and for displaying the network data filtered based upon such identified critical network entities and applications. Thus, a network manager can view the displayed network data and effectively manage the network 100. Note that the network data may be provided to the visualizer 102 from sources other than the sniffer devices 104, although in FIG. 1 only the sniffers 104 are illustrated as providing the network data to the visualizer 102.

Figure 2:
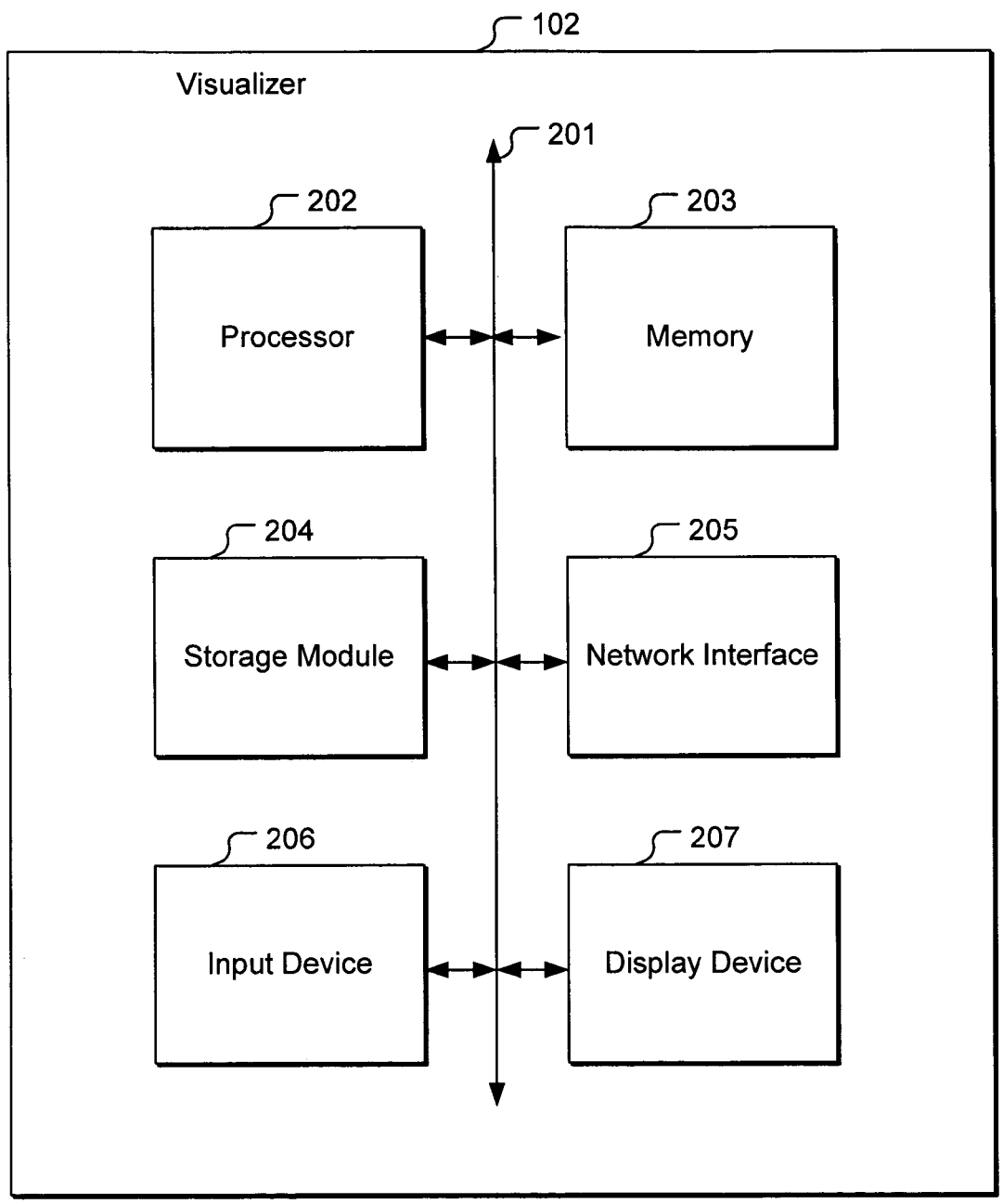
FIG. 2 illustrates the components of the visualizer, according to one embodiment of the present invention.

FIG. 2 illustrates the components of the visualizer 102, according to one embodiment of the present invention. The visualizer 102 can be, for example, a server computer running software for providing the functionalities of the visualizer 102 in accordance with the present invention. In one embodiment, the visualizer 102 includes a processor 202, a memory 203, a storage module (e.g., hard disk drive) 204, an input device (e.g., keyboard, mouse, and the like) 206, a display device 207, and a network interface 205, exchanging data with one another through a bus 201.

The network interface 205 may include a NIC (network interface card) or other standard network interfaces to communicate with other network interface devices coupled to the network 100. For example, the network interface 205 may be an Ethernet interface, a WiFi (IEEE 802.11) interface, or other types of wired or wireless network interfaces. The visualizer 102 receives network data (records) from the sniffers 104 over the network 100 through the network interface 205.

The storage module 204 stores software for identifying critical network entities and applications and displaying network data, according to the present invention. Such visualizer software is loaded to the memory 203 and run by the processor 202. The storage module 203 also stores the network data (raw or pre-processed) received from the sniffers 104 for processing by the visualizer software. The display device 207 can be a standard liquid crystal display or any other types of display devices, and displays various network statistics in accordance with the network data filtered according to the present invention, as will be explained in greater detail with reference to FIGS. 3 and 4. Note that not all components of the visualizer 102 are shown in FIG. 2 and that certain components not necessary for illustration of the present invention are omitted herein.

Figure 3:
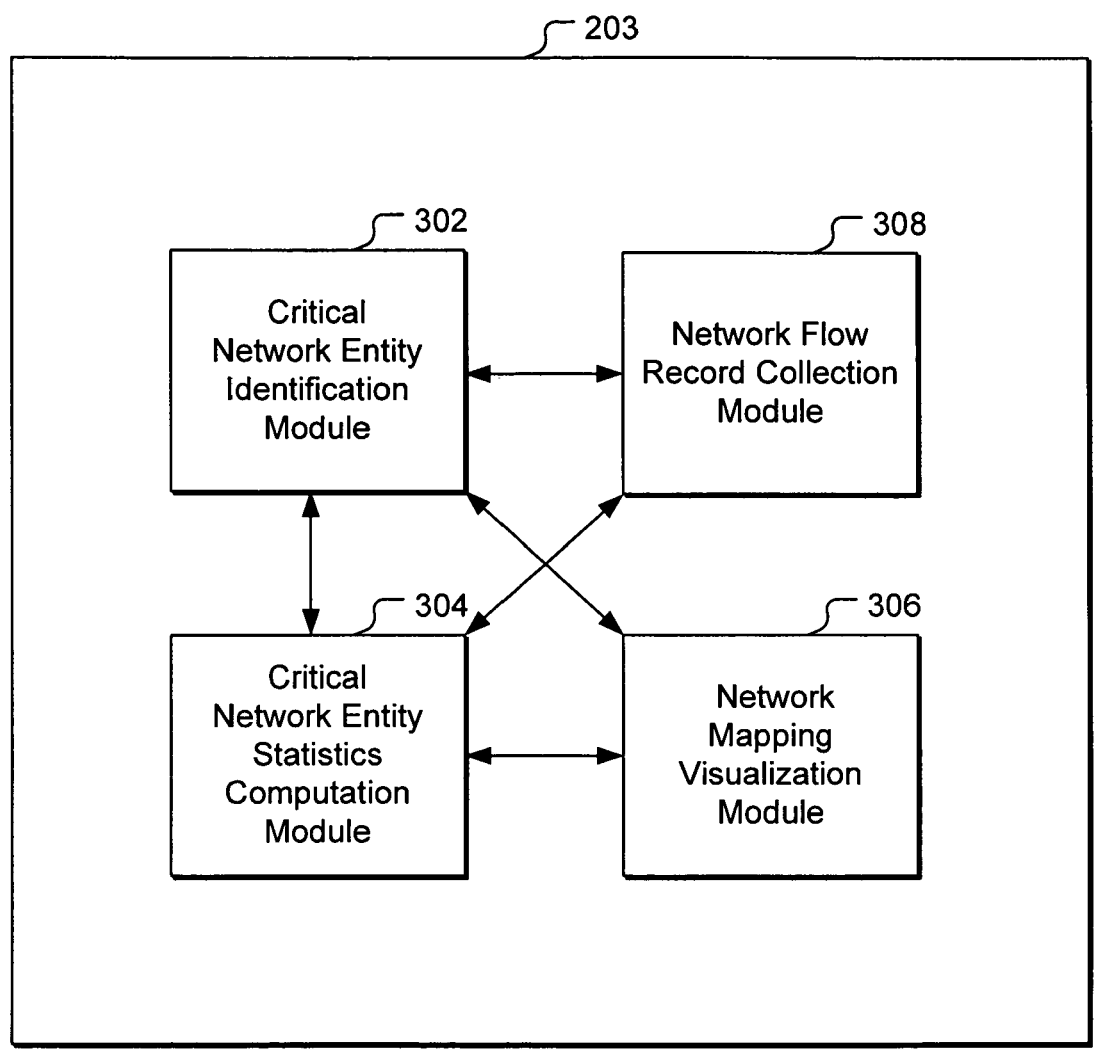
FIG. 3 illustrates the functional modules of the visualizer software, according to one embodiment of the present invention.
Figure 4:
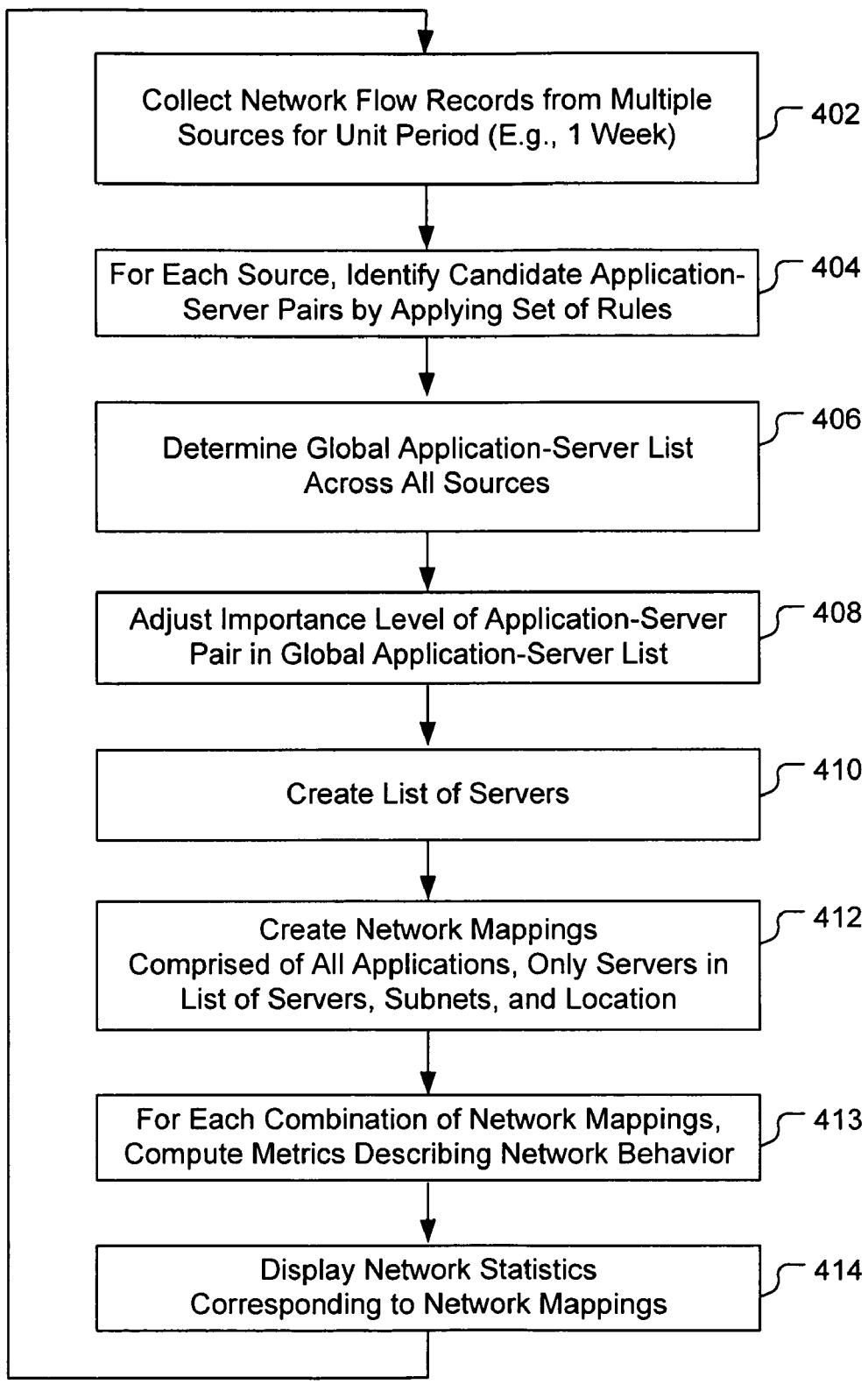
FIG. 4 illustrates a method of identifying critical network application-server pairs and displaying network statistics for network mappings filtered based on the identified critical application-server pairs, according to one embodiment of the present invention.

FIG. 3 illustrates the functional modules of the visualizer software, according to one embodiment of the present invention, and FIG. 4 illustrates a method of identifying critical network application-server pairs and displaying network statistics for network mappings filtered based on the identified critical application-server pairs, according to one embodiment of the present invention. The functional modules shown in FIG. 3 are software components for identifying critical network entities and applications and for displaying filtered network data corresponding to the identified critical network entities and applications according to the present invention. The functional modules are shown loaded to the memory 203, and include a network flow record collection module 308, a critical network entity identification module 302, a critical network entity statistics computation module 304, and a network mapping visualization module 306, all in communication with each other either directly or indirectly.

Referring to FIGS. 3 and 4 together, the network flow record collection module 308 includes functionalities for collecting the network flow records received from a plurality of sources such as from the various sniffer devices 104 or other sources through the network 100, and for storing the collected network flow records in a storage device such as the storage module 204 for further processing (step 402). The network flow record collection module 308 accumulates and stores the network flow records for unit periods (e.g., 1 week) for further processing by the other modules 302, 304, 306.

The critical network entity identification module 302 processes and analyzes the accumulated network flow records to identify, for each source, candidate application-server pairs that may be critical application-server pairs (step 404). In order to identify the candidate application-server pairs, the critical network entity identification module 302 applies a set of a plurality of rules (step 404). An "application" herein refers to high level communication protocols (e.g., http, DNS, etc.) employed by the network data.

In this regard, the critical network entity identification module 302 calculates values per hour per interface for certain key indicators, where the key indicators correspond to at least one of the rules. Such key indicators for an application-server pair include (i) Total Bytes (bytes coming into and going out of the server for this application, per hour per interface), (ii) Number of Clients (number of distinct clients accessing the server for this application, per hour per interface), (iii) Percentage of Application Traffic (percentage of traffic into the server for this application, per hour per interface, out of the total traffic for a given application), and (iv) Activity (number of minutes any traffic for the application-server pair is seen, per hour per interface). An "interface" herein refers to a logical network segment or a span port on a network.

The rules are based on such key indicators and determines whether one of the key indicators satisfy a predetermined condition. For example, a first rule may be that the Total Bytes exceed a predetermined amount (e.g., 1 MB), which indicates that the application-server pair is likely to have a significant impact on the network. For another example, a second rule may be that the Number of Clients exceeds a predetermined number of clients (e.g., 20 clients), which indicates that the application-server pair is likely to have a significant impact on the network. The predetermined number of clients can be empirically determined for a particular type of network. For still another example, a third rule may be that the Percentage of Application Traffic exceeds 20%, which indicates that the application-server pair is likely to have a significant impact on the network.

The critical network entity identification module 302 determines how many times at least one rule in the set of rules is satisfied. Then, the critical network entity identification module 302 identifies the corresponding application-server pair as a candidate application-server pair if at least one of the rules is satisfied more than a predetermined number of times (e.g., 20 times) in a unit period (e.g., a week). The critical network entity identification module 302 determines such candidate application-server pairs across each of all the sources for the unit period.

The critical network entity identification module 302 then determines a global application server list combining (i.e., as a union) all the application-server pairs in the identified candidate application-server pairs across all sources (step 406). In addition, the critical network entity identification module 302 adjusts the importance level assigned to the application-server, if such application-server pair is found included in the global application-server list for the unit period (step 408). In one embodiment, the critical network entity identification module 302 assigns a level L1 (indicating a critical entity) to an application-server if the application-server is included in the global application-server list. The critical network entity identification module 302 generates a list of critical servers based upon the importance level assigned to the application-server pairs in the global application-server list (step 410).

The critical network entity statistics computation module 304 creates network mappings across the dimensions comprised of all applications, only the servers in the critical server list generated in step 410, subnets, and location (step 412). Then the critical network entity statistics computation module 304 computes a variety of network metrics or measures describing network behavior for each combination of the network mappings created in step 412 (step 413). Then, the network mapping visualization module 306 displays the calculated measures corresponding to such mappings, and a global view across the virtual circuits is created and displayed with such measures (step 414). Such network metrics or measures include, for example, Total Bytes, Number of Clients, Average/Maximum/Minimum Bytes of Application Traffic Per Hour, Number of Client Subnets, Number of Servers, Number of Applications, Percentage of Traffic from External Networks, External Traffic, etc.

As shown in FIG. 4, steps 402, 404, 406, 408, 412, 413, and 414 are repeated on a recurring basis after a wait period (e.g., a few weeks) or every unit period (e.g.; every week). If an application-server pair is not found in the global application-server list in the next occurrence of step 406 during a subsequent unit period, the critical network entity identification module 302 adjusts the importance level of the application-server pair by lowering the importance level of the application-server pair, for example, to from L1 to L2 (step 408). If an application-server pair is still not found in the global application-server list in another occurrence of step 406 during another subsequent unit period, the critical network entity identification module 302 adjusts the importance level of the application-server pair, for example, by further lowering the importance level from L2 to L3 (step 408). If the application-server pair is still not found in the global application-server list in an additional predetermined number of occurrences of step 406 in still other subsequent unit periods, the application-server pair is dropped with no importance level assigned to it (step 408). If an application-server pair is found in the global application-server list in any occurrence of step 406, the importance level is reset to L1 regardless of its previous importance level assigned to the application-server pair (step 408).

In one embodiment, the critical network entity identification module 302 includes application-server pairs with importance levels L1, L2, or L3 in creating the list of critical servers (step 410). In other embodiments, the critical network entity identification module 302 may include application-server pairs with importance levels L1, L2 only or L1 only in creating the list of critical servers (step 410).

The present invention has the advantage that critical network servers can be identified among a number of entities in the network. Since the network mappings are created based upon the identified critical network servers, the network measures can be filtered to only show data relevant to mappings corresponding to the critical network servers. Therefore, network managers can conveniently determine the critical network entities and their various network measures, and thereby effectively manage the network. For example, network managers can effectively identify which applications and servers are critical to keep their networks running, and which locations are accessing the network resources and on what links. Based on the findings from the displayed network measures, the network manager may tune the network, re-deploy network resources, and identify resource/network mis-configurations. The network managers can monitor these resources in real time, perform focused in-depth analysis in real time, persist data at low granularities for longer periods, and baseline them to identify behavioral anomalies and long-term trends.

Upon reading this disclosure, those of ordinary skill in the art will appreciate still additional alternative processes for identifying business critical network entities from network data collected from a computer network. For example, although the importance levels L1, L2, and L3 were used in the above example to indicate the most important, important, and less important application-server pairs and an application-server first appearing in the global application-server list is assigned an importance level L1, an opposite methodology may be used. For instance, an application-server first appearing in the global application-server list may be assigned the importance level L3, with the importance levels being increased as the application-server appears additional times in the global application-server list in subsequent occurrences of step 406. For another example, the type of rules used to identify the candidate application-server pairs are not limited to those described herein, and different rules relevant to identifying a critical application-server pair may be used instead.

Thus, while particular embodiments and applications of the present invention have been illustrated and described, it is to be understood that the invention is not limited to the precise construction and components disclosed herein. Various modifications, changes and variations which will be apparent to those skilled in the art may be made in the arrangement, operation and details of the method and apparatus of the present invention disclosed herein without departing from the spirit and scope of the invention as defined in the appended claims.

What is claimed is:

1. A computer-implemented method of identifying critical entities in a computer network, the method comprising:
   collecting network flow records for a predetermined period from a plurality of source devices;
   applying, using a visualizer, a plurality of rules to a plurality of application-server pairs based upon the collected network flow records;
   identifying, among the application-server pairs, one or more candidate application-server pairs that satisfy at least one of the plurality of rules during the predetermined period for each of the sources;
   determining, using the visualizer, a global application-server list including the candidate application-server pairs identified across all of the sources;
   adjusting, using the visualizer, importance levels assigned to the application-server pairs based upon said application-server pairs being included in the global application-server list;
   repeating the steps of collecting network flow records, applying a plurality of rules, and identifying the candidate application-server pairs during a subsequent predetermined period;
   determining another global application-server list based upon the candidate application-server pairs identified across all of the sources during the subsequent predetermined period; and
   adjusting the importance levels assigned to the application-server pairs to a lower level if the application-server pairs are not included in said another global application-server list but are included in said global application-server list.

2. The method of claim 1, wherein applying a plurality of rules comprises determining whether each of the application-server pairs satisfies at least one of the plurality of rules in excess of a predetermined number of times during the predetermined period.

3. The method of claim 1, wherein the rules comprise determining whether a total number of bytes of traffic coming into and going out of a server for an application exceeds a predetermined number of bytes, both the server and the application corresponding to one of the application-server pairs.

4. The method of claim 1, wherein the rules comprise determining whether a total number of clients accessing a server for an application exceeds a predetermined number of clients, both the server and the application corresponding to one of the application-server pairs.

5. The method of claim 1, wherein the rules comprise determining whether a percentage of application traffic for an application into a server out of a total application traffic for the application exceeds a predetermined percentage, both the server and the application corresponding to one of the application-server pairs.

6. The method of claim 1, wherein adjusting the importance level comprises assigning high importance levels to the application-servers included in the global application-server list.

7. The method of claim 1, further comprising:
   generating a critical server list including the servers corresponding to one or more of the application-server pairs in the global application-server list;
   generating mappings comprised of all applications, only the servers in said critical server list, subnets, and a location; and
   displaying a plurality of network measures corresponding to the mappings.

8. A computer program product stored on a non-transitory storage module and adapted to perform a computer-implemented method of identifying critical entities in a computer network, the method comprising:
   collecting network flow records for a predetermined period from a plurality of sources;
   applying a plurality of rules to a plurality of application-server pairs based upon the collected network flow records;
   identifying, among the application-server pairs, one or more candidate application-server pairs that satisfy at least one of the plurality of rules during the predetermined period for each of the sources;
   determining a global application-server list including the candidate application-server pairs identified across all of the sources;
   adjusting importance levels assigned to the application-server pairs based upon said application-server pairs being included in the global application-server list; and
   repeating the steps of collecting network flow records, applying a plurality of rules, and identifying the candidate application-server pairs during a subsequent predetermined period;
   determining another global application-server list based upon the candidate application-server pairs identified across all of the sources during the subsequent predetermined period; and
   adjusting the importance levels assigned to the application-server pairs to a lower level if the application-server pairs are not included in said another global application-server list but are included in said global application-server list.

9. The computer program product of claim 8, wherein applying a plurality of rules comprises determining whether each of the application-server pairs satisfies at least one of the plurality of rules in excess of a predetermined number of times during the predetermined period.

10. The computer program product of claim 8, wherein the rules comprise determining whether a total number of bytes of traffic coming into and going out of a server for an application exceeds a predetermined number of bytes, both the server and the application corresponding to one of the application-server pairs.

11. The computer program product of claim 8, wherein the rules comprise determining whether a total number of clients accessing a server for an application exceeds a predetermined number of clients, both the server and the application corresponding to one of the application-server pairs.

12. The computer program product of claim 8, wherein the rules comprise determining whether a percentage of application traffic for an application into a server out of a total application traffic for the application exceeds a predetermined percentage, both the server and the application corresponding to one of the application-server pairs.

13. The computer program product of claim 8, wherein adjusting the importance level comprises assigning high importance levels to the application-servers included in the global application-server list.

14. The computer program product of claim 8, wherein the method further comprises:
- generating a critical server list including the servers corresponding to one or more of the application-server pairs in the global application-server list;
- generating mappings comprised of all applications, only the servers in said critical server list, subnets, and a location; and
- displaying a plurality of network measures corresponding to the mappings.

15. A system for identifying critical entities in a computer network, the system comprising:
- a processor;
- a storage module coupled to the processor, the storage module including instructions that when executed by the processor cause the processor to implement:
- a network flow record collection module for collecting network flow records for a predetermined period from a plurality of sources, the network flow record collection module repeats collecting network flow records during a subsequent predetermined period; and
- a critical network entity identification module for applying a plurality of rules to a plurality of application-server pairs based upon the collected network flow records, and identifying, among the application-server pairs, one or more candidate application-server pairs that satisfy at least one of the plurality of rules during the predetermined period for each of the sources, determining a global application-server list including the candidate application-server pairs identified across all of the sources, and adjusting importance levels assigned to the application-server pairs based upon said application-server pairs being included in the global application-server list;
- wherein the critical network entity identification module repeats applying the plurality of rules and identifying the candidate application-server pairs during the subsequent predetermined period; and
- the critical network entity identification module determines another global application-server list based upon the candidate application-server pairs identified across all of the sources during the subsequent predetermined period and adjusts the importance levels assigned to the application-server pairs to a lower level if the application-server pairs are not included in said another global application-server list but are included in said global application-server list.

16. The system of claim 15, wherein applying a plurality of rules comprises determining whether each of the application-server pairs satisfies at least one of the plurality of rules in excess of a predetermined number of times during the predetermined period.

17. The system of claim 15, wherein the rules comprise determining whether a total number of bytes of traffic coming into and going out of a server for an application exceeds a predetermined number of bytes, both the server and the application corresponding to one of the application-server pairs.

18. The system of claim 15, wherein the rules comprise determining whether a total number of clients accessing a server for an application exceeds a predetermined number of clients, both the server and the application corresponding to one of the application-server pairs.

19. The system of claim 15, wherein the rules comprise determining whether a percentage of application traffic for an application into a server out of a total application traffic for the application exceeds a predetermined percentage, both the server and the application corresponding to one of the application-server pairs.

20. The system of claim 15, wherein the critical network entity identification module adjusts the importance level by assigning high importance levels to the application-servers included in the global application-server list.

21. The system of claim 15, wherein the critical network entity identification module generates a critical server list including the servers corresponding to one or more of the application-server pairs in the global application-server list, and the system further comprises:
- a network mapping visualization module for generating mappings
    - comprised of all applications, only the servers in said critical server list, subnets, and a location and for displaying a plurality of network measures corresponding to the mappings.

* * * * *